US007905419B2

(12) United States Patent  (10) Patent No.: US 7,905,419 B2
Charrat  (45) Date of Patent: Mar. 15, 2011

(54) METHOD FOR ROUTING OUTGOING AND INCOMING DATA IN AN NFC CHIPSET

(75) Inventor: Bruno Charrat, Aix en Provence (FR)

(73) Assignee: Inside Contactless, Aixen-en-Provence Cedex (FR)

( * ) Notice: Subject to any disclaimer, the term of this patent is extended or adjusted under 35 U.S.C. 154(b) by 486 days.

(21) Appl. No.: 11/746,739

(22) Filed: May 10, 2007

(65) Prior Publication Data

US 2007/0263595 A1  Nov. 15, 2007

(30) Foreign Application Priority Data

May 10, 2006 (FR) ..................................... 06 04179
May 10, 2006 (FR) ..................................... 06 04180

(51) Int. Cl.
  *G06K 19/06* (2006.01)
(52) U.S. Cl. .......... 235/492; 235/451; 235/487; 455/73; 455/90.3
(58) Field of Classification Search .................. 235/451, 235/487, 492; 370/329, 351, 352, 389, 395.1, 370/395.3, 395.31; 340/10.34, 572.1, 825.49; 455/73, 90.3
See application file for complete search history.

(56) References Cited

U.S. PATENT DOCUMENTS

| 6,839,849 | B1 * | 1/2005 | Ugon et al. ...................... 726/20 |
| 7,023,341 | B2 * | 4/2006 | Stilp ........................... 340/572.1 |
| 7,128,274 | B2 * | 10/2006 | Kelley et al. .................. 235/492 |
| 7,324,476 | B2 * | 1/2008 | Agrawal et al. ................ 370/329 |
| 7,597,250 | B2 * | 10/2009 | Finn ................................ 235/380 |
| 2003/0030568 | A1 * | 2/2003 | Lastinger et al. ........ 340/825.49 |
| 2004/0065734 | A1 * | 4/2004 | Piikivi ............................ 235/451 |
| 2004/0195325 | A1 * | 10/2004 | Kogawa ......................... 235/451 |
| 2005/0083181 | A1 * | 4/2005 | Jalkanen et al. ............ 340/10.34 |
| 2006/0111053 | A1 * | 5/2006 | Wu et al. ...................... 455/90.3 |
| 2007/0026826 | A1 * | 2/2007 | Wilson .......................... 455/130 |

(Continued)

FOREIGN PATENT DOCUMENTS

EP  1 327 222 B1  4/2004

(Continued)

OTHER PUBLICATIONS

"Identification cards—Contactless integrated circuits(s) cards—Proximity", Part 2: "Radio frequency power and signal interface", ISO/IEC 1443-2, pp. 1-11 & 1-21, (2007).

(Continued)

*Primary Examiner* — Steven S Paik
*Assistant Examiner* — William M Anderson, Jr.
(74) *Attorney, Agent, or Firm* — Panitch Schwarze Belisario & Nadel LLP (57) ABSTRACT

A method for routing data in a chipset comprising at least one host processor and an RFID-type contactless data send/receive interface includes, in response to a command for opening a data path sent by a source point located in the host processor and designating a destination point located in the contactless data send/receive interface, defining a data path linking the source point to the destination point by allocating to the data path a routing channel number and by saving in a routing table the routing channel number and routing parameters comprising at least one identifier of the source point and one identifier of the destination point, and sending to the destination point data supplied by the source point by encapsulating the data in a frame having a header field comprising the routing channel number.

22 Claims, 6 Drawing Sheets

U.S. PATENT DOCUMENTS

2007/0250707 A1* 10/2007 Noguchi .................. 713/164

FOREIGN PATENT DOCUMENTS

| EP | 1617738 A2 | 1/2006 |
|---|---|---|
| JP | H05-159114 A | 6/1993 |
| JP | 2000-182007 A | 6/2000 |
| JP | 2002-509407 A | 3/2002 |
| JP | 2005-208779 A | 8/2005 |
| JP | 2005-332365 A | 12/2005 |
| JP | 2006-020175 A | 1/2006 |
| JP | 2006-033293 A | 6/2006 |
| WO | 98/27670 A1 | 6/1998 |
| WO | 99/31918 A1 | 6/1999 |
| WO | 03/017103 A1 | 2/2003 |
| WO | 2004/029860 A1 | 4/2004 |

OTHER PUBLICATIONS

"Identification cards—Contactless integrated circuit(s)—Vicinity cards", Part 3: "Anticollision and transmission protocol", ISO/IEC 15693-3, pp. 1-46, (2001).

* cited by examiner

METHOD FOR ROUTING OUTGOING AND INCOMING DATA IN AN NFC CHIPSET

BACKGROUND OF THE INVENTION

Embodiments of the present invention relate to a method for routing data in a chipset comprising at least one host processor and a Radio Frequency Identification (RFID)-type contactless data send/receive interface.

Embodiments of the present invention also relate to a data send/receive circuit comprising an RFID-type contactless data send/receive interface, a controller and at least one input/output port to link the data send/receive interface to a host processor.

Embodiments of the present invention relate particularly to the production of a Near Field Communication (NFC) chipset.

NFC technology is currently developed by an industrial consortium grouped under the name Forum NFC (http://www.nfc-forum.org). The NFC technology is derived from RFID technology and uses NFC readers having several operating modes, i.e., a "reader" Mode, a "card emulation" mode, and a "device" mode (also referred to as "device-to-device" mode). In the "reader" mode, the NFC reader operates like a conventional RFID reader to read- or write-access an RFID chip (chip card or contactless tag). It emits a magnetic field, sends data by modulating the amplitude of the magnetic field, and receives data by load modulation and inductive coupling. In the "emulation" mode, described by the patent EP 1 327 222 in the name of the applicant, the NFC reader operates passively like a transponder to communicate with another reader and to be seen by the other reader as an RFID chip. The reader does not emit any magnetic field, receives data by demodulating a magnetic field emitted by the other reader, and sends data by modulating the impedance of its antenna circuit (load modulation). In the "device" mode, the reader must match with another reader also located in the same operating mode, and each reader alternately goes into a passive state (without field emission) for receiving data and into an active state (with field emission) for sending data.

In addition to these three operating modes (other operating modes could be designed in the future), an NFC reader can implement several contactless communication protocols and is, for example, capable of exchanging data according to the ISO 14443-A protocol, the ISO 14443-B protocol, the ISO 15693 protocol, or the like. Each protocol defines a frequency of emission of the magnetic field, a modulation method for modulating the amplitude of the magnetic field to send data in active mode, and a load modulation method by inductive coupling to send data in passive mode. Therefore, an NFC reader is a multimode and multi-protocol device. The applicant markets for example an NFC reader under the name "MicroRead".

Figure 1:
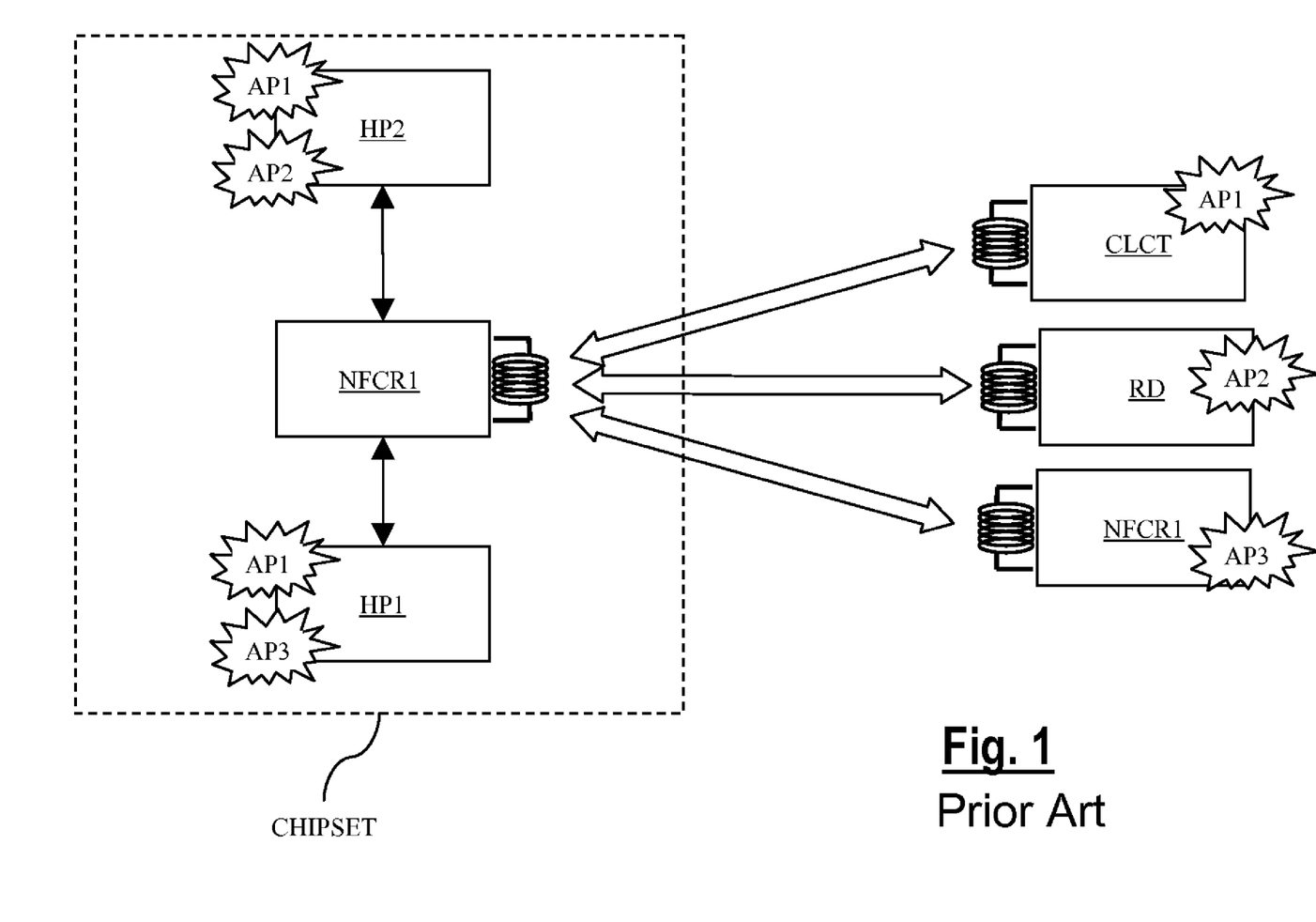
FIG. 1 described above represents in block form a classic architecture of NFC chipset, and contactless circuits with which the NFC chipset can communicate.
Figure 2:
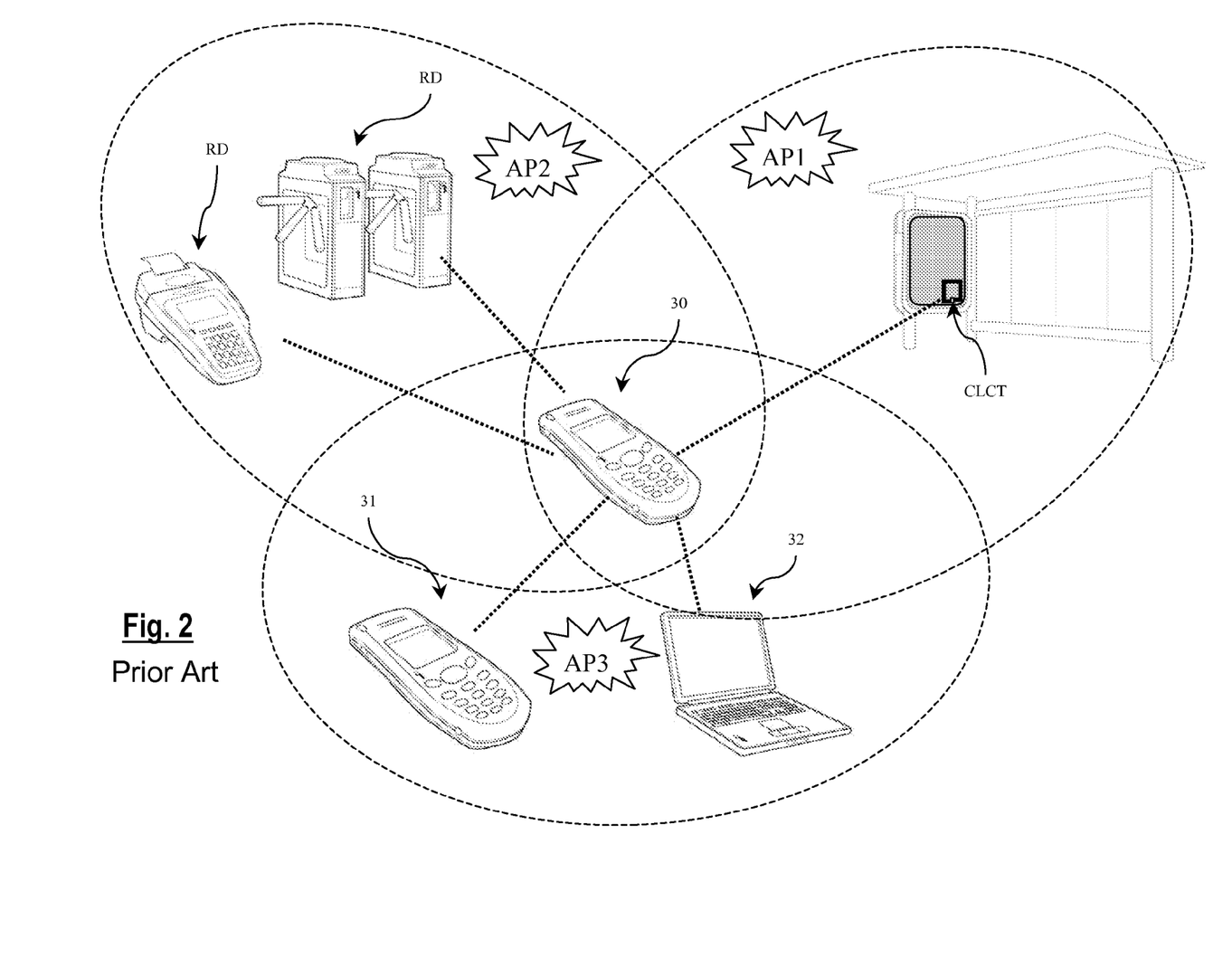
FIG. 2 described above shows various applications of an NFC chipset integrated into a mobile telephone.

Due to its extended communication capacities, an NFC reader is intended to be integrated into portable devices such as cellular telephones or Personal Digital Assistant (PDAs). The result is the production of an NFC chipset of the type represented in FIG. 1, i.e., a chipset comprising an NFC reader (referenced "NFCR1") and at least one first host processor HP1. "Host processor" means any integrated circuit comprising a microprocessor or a microcontroller that is connected to a port of the NFC reader. In many applications, the chipset also comprises a second host processor HP2. The first host processor HP1 is the main processor of the device in which the NFC reader is integrated, while the second host processor HP2 is a secure circuit. The host processor HP1 is, for example, the baseband circuit (or radiotelephone circuit) of a mobile telephone and the host processor HP2 is, for example, a SIM card (i.e., the microcontroller present in a SIM card). Therefore, the resources of the NFC reader are made available to the two processors HP1, HP2 to enable them to manage contactless applications. Such applications are shown in FIG. 2, which represents a mobile telephone 30 equipped with the NFC chipset of FIG. 1. The following can be distinguished:

1) Applications of AP1 Type: The NFC reader of mobile telephone 30 is in "reader" mode to read or write to a contactless integrated circuit CLCT. The mobile telephone 30 is in this case used like an RFID reader. This type of application can be free of charge and consist, for example, in reading advertising data inserted into an advertisement of a bus shelter. The application can also be payable and consist of, for example, reading information reserved for subscribers. The program of the application AP1 is preferably held and executed by the processor HP1 if the service is free of charge or is preferably held and executed by the processor HP2 if the service is payable, as it requires an identification of the subscriber. Thus, as shown in FIG. 1, an application AP1 can be processed by the processor HP1 or the processor HP2.

2) Applications of AP2 Type: The NFC reader of the telephone 30 is in "card emulation" mode to be read by conventional RFID readers in payment or payable access control applications (payment machine, entrance to the subway, etc.). The mobile telephone 30 is then used like a chip card. The program of the application AP2 is preferably held and executed by the secure processor HP2, as represented in FIG. 1, as access to the service requires an identification of the subscriber.

3) Applications of AP3 Type: The NFC reader of the telephone 30 is in "device" mode and communicates with another device, such as a reader integrated into another mobile telephone 31 or a computer 32. This type of application is generally free of charge and enables data packets to be transferred from one device to another (particularly point-to-point file transfer). The program of the application AP3 is preferably held and executed by the non-secure processor HP1, as shown in FIG. 1, which has a computing power greater than the secure processor HP2 if the latter is a SIM card processor.

Thus, the production of an NFC chipset requires providing a routing of data streams between each of the processors HP1, HP2 and the NFC reader (data sent via the contactless data transmission channel) and of incoming data streams (data received via the contactless data transmission channel) between the NFC reader and each of the processors HP1, HP2. This poses a certain number of practical problems that will be understood with reference to FIGS. 3A and 3B.

Figure 3A:
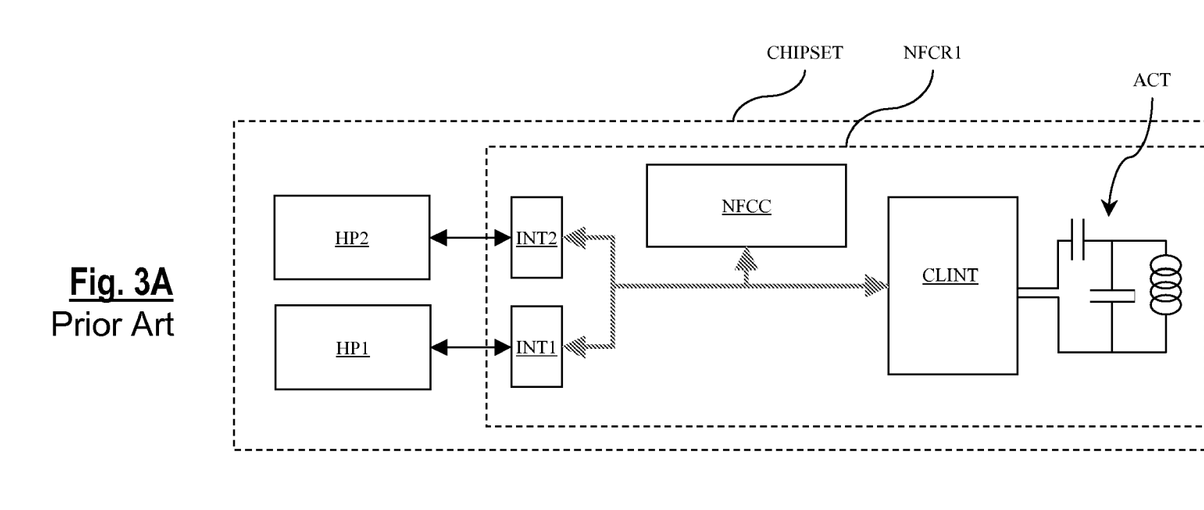
FIG. 3A described above represents in block form the classic architecture of an NFC reader present in the NFC chipset in FIG. 1.

FIG. 3A schematically represents the architecture of the NFC reader. The reader comprises a contactless data send/receive interface CLINT equipped with an antenna circuit ACT, hard-wire communication interfaces INT1, INT2 linked to the interface CLINT, and a controller NFCC. An interface INT1 is connected to the host processor HP1 and an interface INT2 is connected to the host processor HP2, the assembly forming an NFC chipset (referred to as "CHIPSET").

Figure 3B:
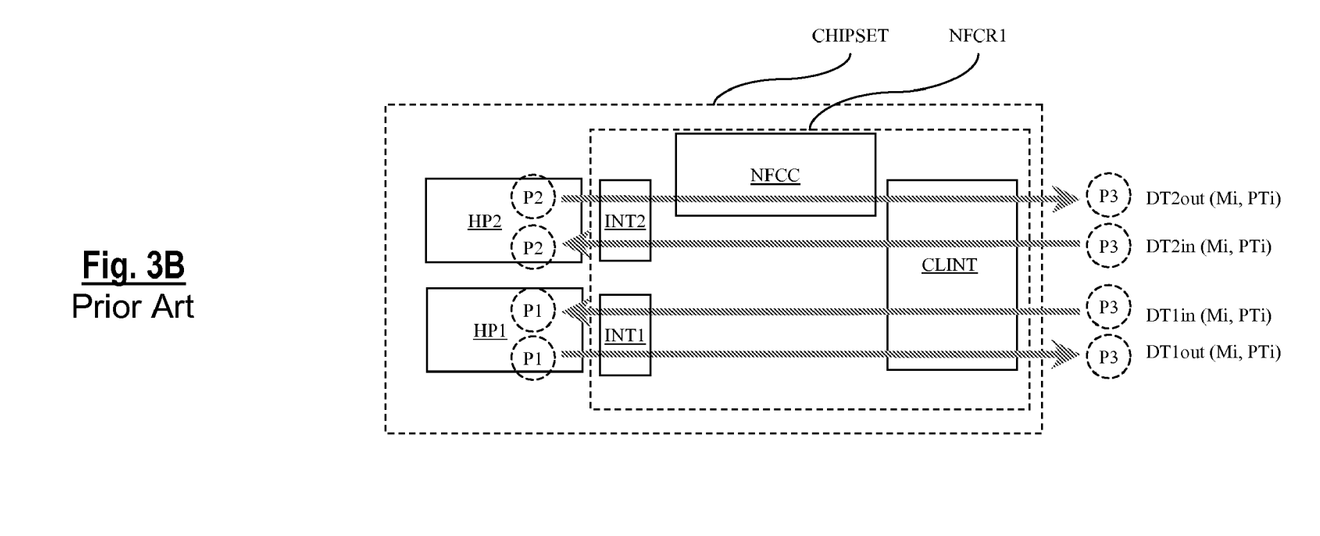
FIG. 3B described above represents data streams passing through the NFC chipset and corresponding to different applications.

FIG. 3B represents the data streams that must be directed so that the resources of the contactless data send/receive interface CLINT can be used by each of the processors HP1, HP2. It is assumed for the sake of simplicity that the interface CLINT can send or receive data according to three protocols PT1, PT2, PT3 only, such as ISO 14443-A, ISO 14443-B and ISO 15693, and has the three abovementioned operating modes M1, M2, M3 ("reader" mode, "emulation" mode and "device" mode). Thus, four different types of data streams can be distinguished:

1) an outgoing data stream DT1out(Mi, PTi) coming from a source point P1 located in the processor HP1, sent to a destination point P3 located in the interface CLINT, and then sent thereby via a contactless data transmission channel created according to a protocol PTi (PT1, PT2 or PT3) and an operating mode Mi (M1, M2 or M3);

2) an outgoing data stream DT2out(Mi, PTi) coming from a source point P2 located in the processor HP2, transmitted to a destination point P3 located in the interface CLINT, and then sent thereby via a contactless data transmission channel created according to a protocol PTi and an operating mode Mi;

3) an incoming data stream DT1in(Mi, PTi) received by the interface CLINT via a contactless data transmission channel created according to a protocol PTi and an operating mode Mi, then sent by the interface CLINT from a source point P3 up to a destination point P1 located in the processor HP1; and 4) an incoming data stream DT2in(Mi, PTi) received by the interface CLINT via a contactless data transmission channel created according to a protocol PTi and an operating mode Mi, then sent by the interface CLINT from a source point P3 up to a destination point P2 located in the processor HP2.

As each outgoing data stream can be sent in three operating modes M1, M2, M3 and according to three protocols PT1, PT2, PT3, it follows that 9 different configurations are possible for each outgoing data stream (assuming that each mode Mi/protocol PTi combination is authorized). It is therefore not sufficient for one of the processors HP1 or HP2 to transmit to the interface CLINT only the data to be sent. The processor must also specify, for each string of data sent, the mode/protocol Mi/PTi configuration to be used by the interface CLINT to transmit these data in a contactless data transmission channel.

To enable the routing of outgoing data while allowing the interface CLINT to be appropriately configured, it has been proposed to provide a "Host Controller Interface" (HCI) data transfer protocol of "universal" type, enabling any type of host processor to supply the interface CLINT with data to be sent, while specifying the configuration to be used (protocol PTi and operating mode Mi) to transmit the data in the contactless communication channel. Such an HCI protocol provides data frames, each comprising header fields and data fields. The header fields contain the information required to control the interface CLINT, particularly fields specifying the starting and destination points of the data, the operating mode and the protocol to be used by the interface CLINT.

However, classic HCI protocol provides data frames having long and complex header fields, requiring a considerable processing time before the data is processed. This problem is referred to as "overheading", which means that excessively long frame headers overload the data streams and increase the data transmission time. These large header fields further require large buffers and high processing capacity.

It is therefore desirable to provide a method for routing data in an NFC chipset that is simple to implement and does not require any long header fields, while enabling the protocol and the operating mode parameters of the contactless data send/receive interface to be set.

Additionally, when incoming data is received, the contactless data send/receive interface CLINT and the controller NFCC do not necessarily know which is the recipient host processor of the data. As a result, the data is sent to both processors, and it is up to the unintended processor to not respond.

The application WO 2004/029860 suggests a routing method that includes, as means for routing incoming data, the Application Protocol Data Unit (APDU) field located in commands received via the contactless data transmission channel. However, as indicated at page 13 of said application, the method requires new protocols to be developed to implement the routing, which means that the external unit sending the data in the contactless data transmission channel must specify for which internal unit (host processor) the data is intended.

In many current applications, the external unit sending data is not designed to give routing indications specifying which is the processor receiving the data. Indeed, the routing is an internal problem linked to the fact that several processors of a same chipset share the same contactless data send/receive interface. It is therefore quite unlikely that in a near future a universal routing protocol will be integrated into devices that do not meet an NFC standard. For example, a conventional reader used for payment or control access sends authentication and/or secret code verification commands destined for contactless chip cards. Therefore, during an authentication, such a reader does not know whether it is addressing a real contactless card or an NFC chipset in card emulation mode. As a result, such a reader is not designed to send parameters enabling the application data it sends to be routed inside the chipset.

BRIEF SUMMARY OF THE INVENTION

Embodiments of the present invention provide a method enabling, in an NFC chipset, the recipient host processor of data received via a contactless data transmission channel to be determined, without necessarily having to analyze the content of these data.

One embodiment of the present invention provides a method for routing data in a chipset comprising at least one host processor and an RFID-type contactless data send/receive interface. The method includes, in response to a command for opening a data path sent by a source point located in the host processor, and designating a destination point located in the contactless data send/receive interface, defining a data path linking the source point to the destination point by allocating to the data path a routing channel number and by saving in a routing table the routing channel number and routing parameters comprising at least one identifier of the source point and one identifier of the destination point; sending to the destination point data supplied by the source point by encapsulating them in a frame having a header field comprising the routing channel number; and upon receiving data encapsulated in a frame having a header field comprising the routing channel number, searching for a destination point of the data in the routing table by using the routing channel number as index to select the destination point.

According to one embodiment implemented in a chipset wherein the contactless data send/receive interface is configurable according to several operating modes and according to several contactless communication protocols, the method includes, in response to a command for opening a data path sent by a source point located in the host processor, and designating a destination point located in the contactless data send/receive interface, opening a data path between the source point and the destination point by allocating to the data path a routing channel number and by saving in the routing table the routing channel number and routing parameters comprising an operating mode parameter of the contactless data send/receive interface and a contactless communication protocol parameter, and configuring the contactless data send/receive interface so that it sends data in a contactless data transmission channel by using the operating mode and contactless communication protocol parameters contained in the routing table for the data path through which the data to be sent have been received.

According to one embodiment implemented in a chipset comprising at least two host processors, the routing table is further used to open a data path between the two host processors.

According to one embodiment, the method further comprises providing commands for creating data paths comprising routing parameters and configuration parameters for configuring the contactless data send/receive interface to be saved in the routing table.

According to one embodiment, the routing table is filled or emptied dynamically when data paths having a source point located in a host processor are created or closed.

According to one embodiment, the method further comprises pre-saving in the routing table data paths having a source point located in a host processor.

According to one embodiment implemented in a chipset comprising at least two host processors, when data is received by the contactless data send/receive interface via a contactless data transmission channel, at least one recipient host processor of the data is identified using at least the operating mode and the contactless communication protocol used by the contactless data send/receive interface to create the contactless data transmission channel through which the data is received.

According to one embodiment, the method further comprises pre-saving in the routing table data paths having a source point located in the contactless data send/receive interface, and for each of these data paths, at least one identifier of a destination point, an operating mode parameter of the contactless data send/receive interface and a contactless communication protocol parameter, and, when data is received by the contactless data send/receive interface via a contactless data transmission channel, determining at least one destination point of the data by searching in the routing table for a data path having an operating mode parameter and a contactless communication protocol parameter corresponding to the operating mode and contactless communication protocol parameters used by the contactless data send/receive interface to create the contactless data transmission channel through which the data are received.

According to one embodiment, source points or destination points saved in the routing table are services executed by a host processor.

According to one embodiment, the routing parameters stored in the routing table further include an identifier of a point of notification which must receive a copy of the data sent to the destination point.

According to one embodiment, the method is implemented in a chipset in which a host processor is a secure circuit such as a SIM card integrated circuit.

Another embodiment of the present invention relates to a device for sending/receiving data comprising an RFID-type contactless data send/receive interface, a controller, and at least one input/output port to link the contactless data send/receive interface to a host processor. The controller is configured for, in response to a command for opening a data path sent by a source point located in a host processor and designating a destination point located in the contactless data send/receive interface, opening a data path between the source point and a destination point by allocating to the data path a routing channel number and by saving in a routing table the routing channel number and routing parameters comprising at least one identifier of the source point and one identifier of the destination point, and, upon receiving data encapsulated in a frame having a header field comprising the routing channel number, searching for a destination point of the data in the routing table using the routing channel number as index to select the destination point.

According to one embodiment, the contactless data send/receive interface is configurable according to several operating modes and according to several contactless communication protocols. The controller is configured for, in response to a command for opening a data path sent by a source point located in the host processor and designating a destination point located in the contactless data send/receive interface, opening a data path between the source point and the destination point by allocating to the data path a routing channel number and by saving in the routing table the routing channel number and routing parameters comprising an operating mode parameter of the contactless data send/receive interface and a contactless communication protocol parameter. The contactless data send/receive interface is configured for sending data in a contactless data transmission channel by using the operating mode and contactless communication protocol parameters contained in the routing table for the data path through which the data to be sent has been received.

According to one embodiment, the device further comprises at least two input/output ports and the controller also uses the routing table to open a data path between two host processors.

According to one embodiment, the controller is further configured for decoding commands for creating data paths comprising routing parameters and configuration parameters for configuring the contactless data send/receive interface, and for saving in the routing table the routing and configuration parameters present in the commands.

According to one embodiment, the controller is further configured for dynamically filling or emptying the routing table when data paths having a source point located in a host processor are created or closed.

According to one embodiment, the host processor is configured for pre-saving in the routing table data paths having a source point located in a host processor.

According to one embodiment, the controller or the contactless data send/receive interface is further configured for, when data is received by the contactless data send/receive interface via a contactless data transmission channel, determining a destination point of the data by using the operating mode and the contactless communication protocol used by the contactless data send/receive interface to create the contactless data transmission channel through which the data are received.

According to one embodiment, the controller is further configured for pre-saving in the routing table data paths having a source point located in the contactless data send/receive interface, and for each of these data paths, at least one identifier of a destination point, one operating mode parameter of the contactless data send/receive interface and one contactless communication protocol parameter. When data is received by the contactless data send/receive interface via a contactless data transmission channel the controller is also configured for determining at least one destination point of the data by searching in the routing table for a data path having an operating mode parameter and a contactless communication protocol parameter corresponding to the operating mode and contactless communication protocol parameters used by the contactless data send/receive interface to create the contactless data transmission channel through which the data are received.

According to one embodiment, source points or destination points saved in the routing table are services executed by a host processor.

According to one embodiment, the routing parameters stored in the routing table further include an identifier of a point of notification which must receive a copy of the data sent to the destination point.

According to one embodiment, the device is linked to a host processor formed by a secure circuit such as a SIM card integrated circuit.

BRIEF DESCRIPTION OF THE SEVERAL VIEWS OF THE DRAWINGS

The foregoing summary, as well as the following detailed description of embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 4:
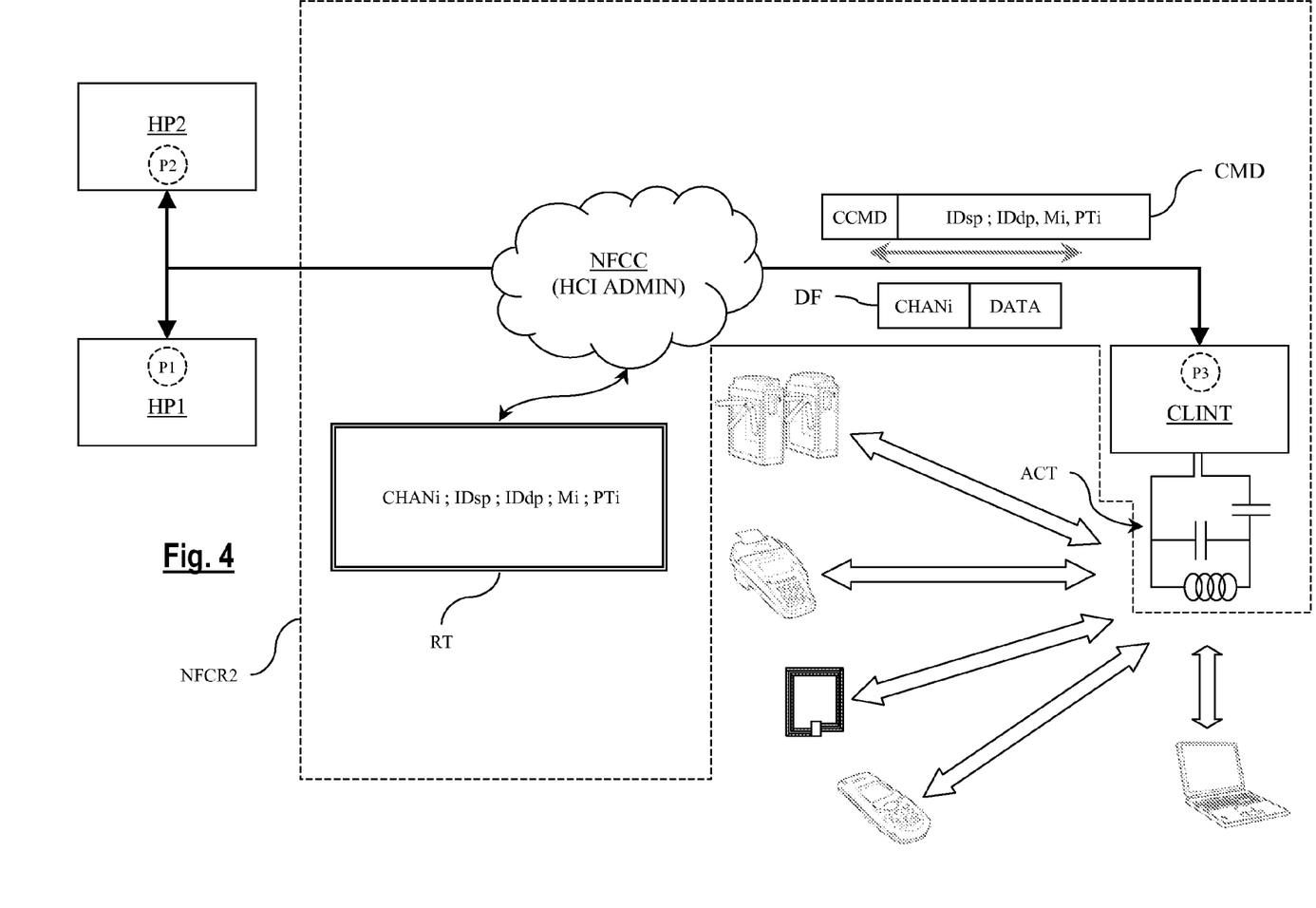
FIG. 4 schematically shows the implementation of the routing method according to the present invention in an NFC chipset.

FIG. 4 schematically shows the implementation of the routing method according to a preferred embodiment of the present invention. The method is implemented in an NFC chipset comprising an NFC reader referenced "NFCR2" and host processors HP1, HP2 already described above. The reader NFCR2 comprises the same units as the reader NFCR1 described above, particularly a controller NFCC and a contactless data send/receive interface CLINT equipped with an antenna circuit ACT. For the sake of simplicity, it is assumed that the interface CLINT can only send or receive data according to three protocols PTi, i.e., the protocol PT1 (ISO 14443-A or "ISOA"), the protocol PT2 (ISO 14443-B or "ISOB"), and the protocol PT3 (ISO 15693 or "ISO15"). It further has the three abovementioned operating modes Mi, i.e., M1 ("reader" mode), M2 ("card emulation" mode) and M3 ("device" mode).

Source or destination points of a data stream in the chipset are designated P1 (point located in the host processor HP1), P2 (point located in the host processor HP2) and P3 (point located in the contactless interface CLINT).

The controller NFCC of the NFC reader is used as administrator of an HCI protocol that has the following characteristics: the use of a routing table RT in which data paths are saved, each data path being identified by a routing channel number CHANi; the use of commands CMD enabling the data paths (routing channels) to be managed, particularly commands for opening and closing data paths; and the use of data frames DF comprising a header field and a data field (DATA), the header field including a routing channel number CHANi.

The data paths saved in the routing table are differentiated from one another by at least the following parameters:

CHANi; IDsp; IDdp; Mi; PTi

CHANi is the routing channel number allocated to the data path; IDsp is an identifier of the source point of the data path; IDdp is an identifier of the destination point of the data path; and Mi and PTi are respectively the operating mode and the contactless communication protocol used by the interface CLINT to send or receive data via a contactless data transmission channel.

Examples of routing commands and examples of data frames are described in Appendix 1. For the sake of simplicity, not all of the commands which can be provided are described. Appendix 1 describes essential commands for creating routes, changing routes, and removing routes, and the responses to such commands (confirmation or error messages). Appendix 1 also describes the format of the data frames DF, which advantageously has a small header field comprising only 8 bits.

The commands for opening, closing, or changing a data path are sent by one of the host processors HP1, HP2 or by the interface CLINT and are processed by the controller NFCC. These commands specify the operating mode Mi and the protocol PTi of the interface CLINT for the data path in question. If the opening of a data path is requested by one of the host processors HP1 or HP2, the mode Mi and the protocol PTi contained in the command are used by the controller NFCC to configure the interface CLINT in terms of the contactless communication channel that the interface CLINT must create to send the data that will be received via the data path. If the opening of a data path is requested by the interface CLINT, the operating mode Mi and the protocol PTi specified in the command sent by the interface CLINT are informative and specify the operating mode and protocol conditions in which the interface CLINT has received the data it wants to transmit in the data path.

The actual creation of a data path is performed by the controller NFCC as HCI administrator ("HCI ADMIN"). When a command for creating a data path is received ("creating a route" command) and is receivable, the controller NFCC allocates a routing channel number CHANi to the route, then writes in the routing table RT the parameters IDsp, IDdp, Mi, PTi indicated in the command, and then sends a confirmation message to the entity that sent the command.

An example of a routing table RT created by the controller NFCC is described by Table 1 in Appendix 2. This routing table RT is created after receiving a series of commands for opening routes having source points located in one of the processors HP1 or HP2 (i.e., a source point P1 or P2). Optionally, the controller can define a secondary recipient point intended to receive a copy of the data circulating in the data path. The secondary recipient or point of notification is determined by the controller using a notification table (not represented in the figures) that indicates the data paths for which the data must be notified to the other host processor. Although presented statically in Table 1, the routing table RT is dynamic and is updated in real time according to the creation, modification, or removal commands received by the controller NFCC.

In an alternative embodiment, the routing table RT is static and has been pre-saved by the controller NFCC, for example at the request of one of the host processors HP1 or HP2 and upon the switching on of the chipset. Table 2 in Appendix 2 describes an example of a pre-saved routing table RT having as source points the points P1 or P2 located in the host processors HP1, HP2. The channel number CHANi can also be pre-saved in the table for each possible routing configuration. In such a pre-saved table, a "busy" field is provided in each line of the table (one line corresponding to a routing channel). The controller NFCC writes the value "1" in the "busy" field when it opens the corresponding data path, and writes the value "0" in response to a command for removing the data path.

The transmission of the data received in the data frames is also under the control of the controller NFCC, which refers to the routing table RT to determine the destination points of these data. Advantageously, as can be seen in the format of the data frames described in Appendix 1, it is not necessary for the source point that sends the data to the processor to specify all the parameters of the routing channel used; the header field of the data frame simply comprises parameterizing bits T and L and 6 channel number bits (enabling 63 data paths to be routed simultaneously, the channel "0" being reserved for the administration of the HCI protocol).

Thus, upon receiving a data frame, the controller NFCC sends back the data to the destination point designated in the routing table RT, using the channel number as an index to find this destination point in the routing table RT (and possibly the point of notification). If the destination point is the point P3 (interface CLINT), the controller NFCC sets the parameters of the interface CLINT so that the latter sends the data in a contactless data transmission channel conforming to the contactless protocol PTi and operating mode Mi information contained in the routing table RT. In an alternative embodiment, the interface CLINT sets its parameters itself by reading the routing table RT when data is received in a data frame (which requires part of the remit of the controller NFCC to be transferred to the interface CLINT).

Thus, the routing table RT enables the parameters of the interface CLINT to be set without the need to include the operating mode Mi and contactless communication protocol PTi parameters in the headers of the data frames. The routing table RT is not therefore a simple routing table in the conventional sense of the word, but also forms a parameterization table.

Table 3 in Appendix 2 describes an example of a dynamic routing table RT comprising data paths created at the request of the interface CLINT (having P3 as source point). As desired the interface CLINT and the controller NFCC do not necessarily know which is the recipient host processor of incoming data. As a result, the routing table RT created here by the controller NFCC at the request of the interface CLINT indicates that the data must be sent to both destination points P1, P2 located in the two host processors HP1, HP2, and it is up to the unintended host processor to remain idle and to let the other host processor send response data to the interface CLINT.

It should be noted that the data paths created at the request of one of the host processors HP1, HP2 or at the request of the interface CLINT are preferably bidirectional. Thus, for example, once a data path has been created by a point P1 located in the processor HP1, to send data in a contactless communication channel defined by the mode parameter M2 and the protocol PT2, all the data received by the interface CLINT in the mode M2 and according to the protocol PT2 will be sent in this data path and will therefore be received by the point P1. Those skilled in the art will also note that providing bidirectional data paths implies managing any conflicts by prohibiting two bidirectional paths having different source and/or destination points to use the same mode Mi and protocol PTi parameters for the interface CLINT. For example, the routing table described by Table 1 represents data paths that cannot coexist (e.g., channel 1 and channel 9, these data paths only being described in the same table as an illustration).

The host processors present in an NFC chipset are "specialized" in certain applications or types of application due to their nature (secure or not, SIM card processor or Baseband processor), to their processing capacity and to the processing units they comprise. Out of the various applications that an NFC chipset may have to manage, each application or type of application generally corresponds to a determined operating mode of the contactless data send/receive interface CLINT and to a determined contactless communication protocol (PT1, PT2, PT3, etc.).

As a result, a combination of an operating mode Mi of the interface CLINT and of a protocol PTi can correspond to a type of application that is intended to be managed by a specific host processor. This can be seen in FIG. 1 where it can be seen that secure applications AP2 in "emulation" mode are generally managed by a SIM card (processor HP2), whereas non-secure applications of the type AP3 (for example point-to-point file transfer) are preferentially managed by the Baseband processor due to its higher processing capacity and to the absence of securing of the transfer. Furthermore, the secure applications in "emulation" mode are generally based on the ISOA and ISOB protocols, while the ISO 13693 mode, offering a greater communication distance, is preferably intended for non-secure applications generated by the host processor HP1 and not by the processor HP2, if the latter is a SIM card.

Thus, incoming data routing rules are predefined according to the operating mode Mi of the interface CLINT and to the contactless communication protocol PTi according to which the data are received. The predetermined routing rules are, for example, as follows (but not limited to these examples):

when the interface CLINT receives data in ISO A "reader" mode, the data is sent in priority to the host processor HP1 and is notified to the host processor HP2;

when the interface CLINT receives data in ISO B "reader" mode, the data is sent in priority to the host processor HP1 and is notified to the host processor HP2;

when the interface CLINT receives data in ISO 15693 "reader" mode, the data is sent in priority to the host processor HP2 and is not notified to the host processor HP1;

when the interface CLINT receives data in ISO A "card emulation" mode, the data is sent in priority to the host processor HP2 and is not notified to the host processor HP1;

when the interface CLINT receives data in ISO B "card emulation" mode, the data is sent in priority to the host processor HP1 and is not notified to the host processor HP2;

when the interface CLINT receives data in ISO 15693 "card emulation" mode, the data is only notified to the host processor HP2 and is not sent or notified to the host processor HP1;

when the interface CLINT receives data in ISO A "device" mode (matching managed by the host processor HP1), the data is sent in priority to the host processor HP1 and is notified to the host processor HP2;

when the interface CLINT receives data in ISO B "device" mode, the data is blocked (no action); and when the interface CLINT receives data in ISO 15693 "device" mode (matching managed by the host processor HP1), data is sent in priority to the host processor HP1 and is notified to the host processor HP2.

This set of rules enables an incoming data routing table RT to be defined, as described by Table 4 in Appendix 2. This routing table is static and is pre-saved by the controller NFCC, for example, at the request of the secure processor HP2 and upon the switching on of the NFC chipset. It will be understood that this table can be modified in real time.

Those skilled in the art will note that the routing of the incoming data according to the method described above can be implemented using a classic HCI protocol, i.e., without using a routing table and data frames having a small header field.

Figure 5:
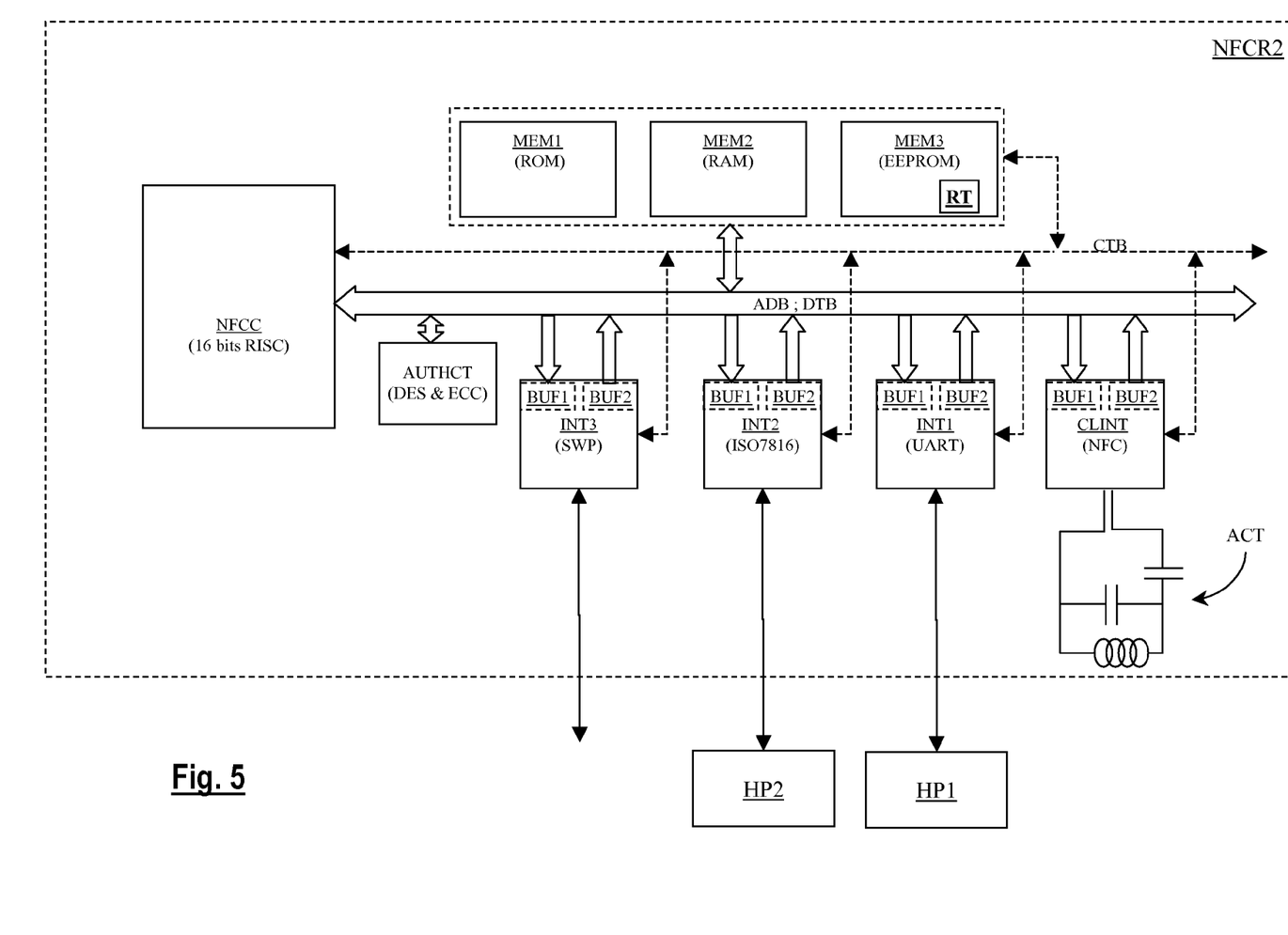
FIG. 5 represents an example of hardware architecture of an NFC reader present in the chipset in FIG. 4.

FIG. 5 represents an example of hardware architecture of the reader NFCR2 in FIG. 4. The reader includes the controller NFCC and the interface CLINT described above; a memory array comprising a program memory MEM1 of ROM type (read-only memory), a data memory MEM2 of RAM type (random access memory), and an EEPROM-type electrically erasable and programmable memory MEM3 in which the routing table RT is saved; an authentication and error correction circuit AUTHCT including DES and ECC algorithms (Error Correction Code); a connection port INT1 of Universal Asynchronous Receiving Transmitting (UART) type, to which the host processor HP1 is connected; a connection port INT2 of ISO7816 type to which the host processor HP2 is connected (the processor HP2 here being assumed to be a SIM card); a connection port INT3 of Single Wire Protocol (SWP) type enabling a third host processor to be connected, for example another secure card; a data bus DTB and an address bus ADB linking the memory array, the controller NFCC, the interface CLINT and the ports INT1, INT2, INT3; and a control bus CTB enabling the controller NFCC to read- and/or write-control and access these various elements.

The interface CLINT and the ports INT1, INT2, INT3 each have an input buffer BUF1 with parallel input and an output buffer BUF2 with parallel output that is write- and respectively read-accessible via the data bus and the address bus. The exchange of data forming the routing commands or the data frames between the host processors HP1, HP2 and the controller NFCC or the interface CLINT is thus performed by data blocks of the size of the buffers BUF1, BUF2, and is paced by the controller NFCC.

Figure 6:
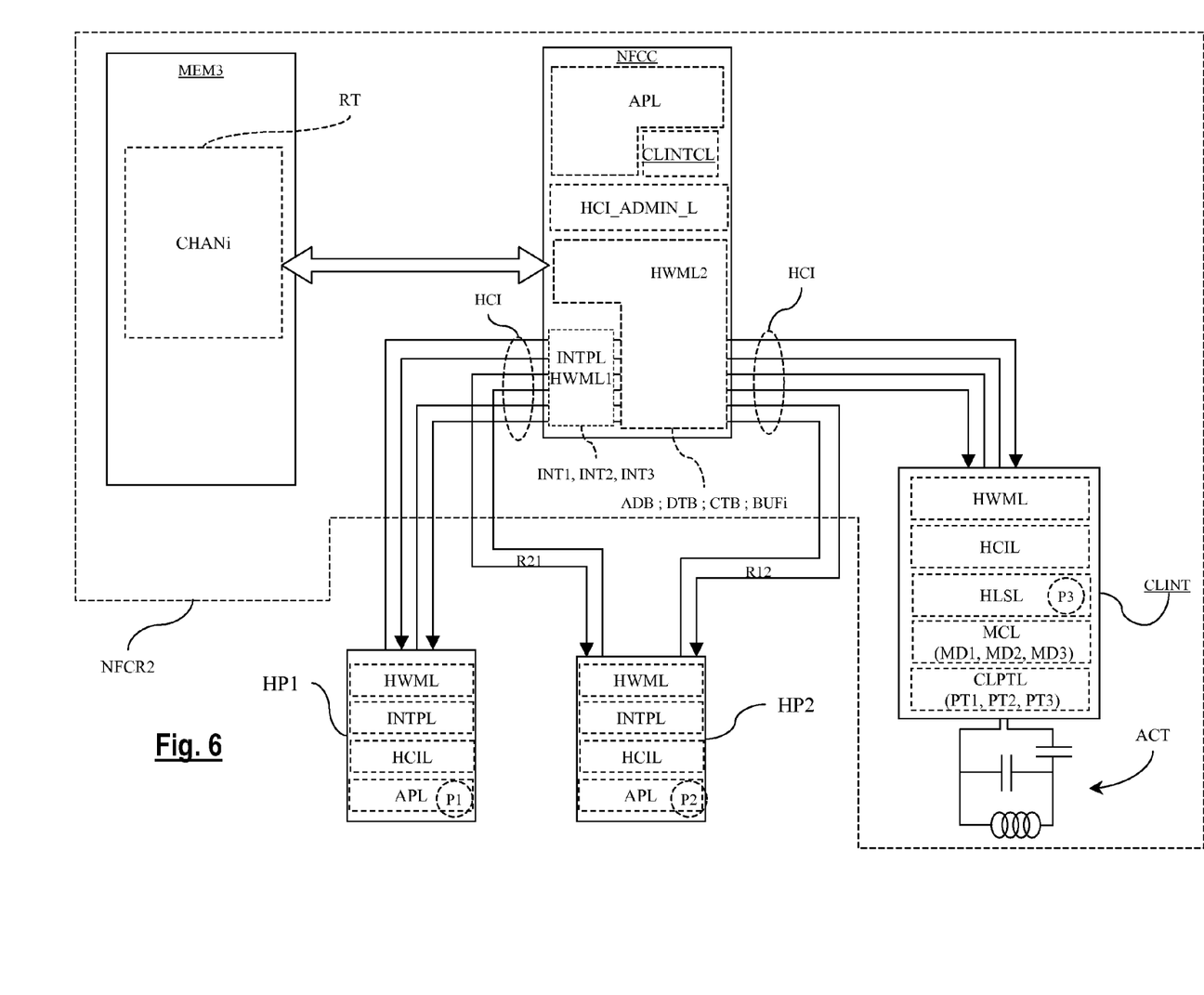
FIG. 6 represents an example of software architecture of the NFC reader in FIG. 5.

FIG. 6 represents an example of software architecture of the reader NFCR2 and of the host processors HP1, HP2. This software architecture comprises, for each element of the chipset, several software layers going from the lowest level (data link layer) to the highest level (application layer). The representation of these software layers in FIG. 6 is simplified compared to the real software architecture of an NFC chipset according to embodiments of the present invention but is sufficient for those skilled in the art wishing to implement embodiments of the present invention.

Each host processor HP1, HP2 comprises at least four software layers, in an ascending order of level:

A lowest level layer Hardware Management Layer (HWML) manages the operation of the hardware elements enabling the host processors to exchange data with the controller NFCC. This is, for example, the management layer of the UART interface for the processor HP1 and the management layer of the ISO7816 interface for the processor HP2.

An Interface Protocol Layer (INTPL) layer manages the protocol of the communication ports INT1, INT2, INT3. This is, for example, the management layer of the UART protocol for the processor HP1 and the management layer of the ISO7816 protocol for the processor HP2.

An HCIL layer manages the HCI protocol i.e., manages the creation of a communication channel by generating the commands described above and in Appendix 1 and by processing the response messages to such commands. This layer rests on the INTPL et HWML layers that are practically transparent to it.

A high level Application layer APL manages the RFID applications such as those represented in FIGS. 2 and 4 (reading a chip card or an electronic tag, emulation of a chip card, dialogue in "device-to-device" mode with an external processor to exchange files, etc.). This layer may comprise several application programs, each being secure or not (according to the internal resources of the processor) and each using a type of protocol PTi and an operating mode Mi of the interface CLINT. Thus, this high level layer rests on the HWML, INTPL layers and the HCIL layer according to the present invention, which are practically transparent to it. The rapidity of the data transfer through the data paths created thanks to the HCIL layer advantageously results in a substantial increase in the performances of the application layer APL.

Additionally, the source or destination points P1 and P2 located in the host processors are "services" (determined applications). These services can each ask the controller NFCC, independently of the other, to create data paths to simultaneously use the interface CLINT (subject to collision of modes and protocols, as indicated above). This software architecture thus enables a service to be implemented as source or destination points of a data path, and enables several data paths to be created simultaneously between two entities, for example between two host processors or between a host processor and the contactless data send/receive interface.

In a substantially similar manner, the controller NFCC includes the following software layers:

Two layers HWML1 and INTPL are of the same type as the layers HWML and INTPL present in the host processors. For the sake of simplicity of the diagram, these layers are represented in the processor NFCC but in reality are located in the ports INT1 and INT2, which are considered to be part of the controller, and the buses ADB, DTB, CTB. Indeed, the processing of the UART and 7816 protocols is performed in the ports INT1, INT2, which make their input and output buffers BUF1, BUF2 available to the controller via the buses ADB, DTB, CTB.

Another low level layer HWML2 enables the controller to write the buffers BUF1 and to read the buffers BUF2, via the buses ADB, DTB, CTB, by breaking down the data frames or the commands into data blocks of the same size as the buffers.

An HCI-ADMIN-L layer or HCI protocol administration layer communicates with the HCIL layers of the host processors HP1, HP2 as routing administrator. Therefore, this layer executes the data path allocation tasks described above, and read- and write-accesses the routing table RT via the low level layer HWML2.

Contactless Interface Control Layer CLINTCL) layer manages the interface CLINT and indicates thereto the mode Mi into which it must put itself and the protocol PTi to be used to send data in a contactless communication channel. For this purpose, the CLINTCL layer uses the parameters PTi and Mi present in the routing table RT. More particularly, the HCI-ADMIN-L layer writes these parameters in the routing table RT in response to commands for opening data paths, while the CLINTCL layer searches for these parameters in the table using as index the channel number of the data frames sent by the host processors HP1, HP2. This layer also controls the interface CLINT in contactless data receipt mode and cyclically asks it to perform a scan of the modes (reader mode, emulation mode and device mode) and, in each mode, to search for incoming data. This means that the interface CLINT emits a magnetic field at regular intervals to poll any contactless cards or tags (or other portable objects operating in a contactless manner) that could be present within its polling range. The interface CLINT also puts itself at regular intervals into a listening mode ("emulation" mode) to detect whether a reader in active mode is sending polling messages.

An optional layer APL can itself manage applications, just like the host processors. Indeed, applications can also be handled by the NFC reader itself. In this case, data can be communicated between the controller NFCC and the interface CLINT by passing through the HCI communication channel according to embodiments of the present invention, if the interface CLINT is equipped with the INTPL layer, which is the case in the embodiment represented in FIG. 6.

Finally, the interface CLINT comprises the following software layers:

on the controller NFCC side, a low level layer HWML equivalent to the layer HWML2 of the controller NFCC, to manage the data buffers BUF1, BUF2 via the buses ADB, DTB, CTB;

an HCIL layer (as indicated above) that makes the interface CLINT compatible with the HCI protocol described above and offers greater implementation possibilities (particularly the fact that the interface CLINT generates the data frames itself to send to the host processors data received via a contactless communication channel);

on the antenna circuit ACT side, CLPTL (Contactless Protocol Layer) and MCL (Mode Control Layer) layers that control or process the electric signals applied to the antenna circuit ACT or received thereby, for the implementation of the operating modes M1, M2, M3 and of the protocols PT1, PT2, PT3; and between the layers located on the controller side and the layers located on the antenna circuit side, a High Level Service Layer HLSL that enables several source or destination points P3 to be defined in the interface CLINT to create several data paths with multiple points P1, P2 in the application layers APL of the host processors HP1, HP2. It will be understood that this high level architecture is optional and multiple points P3 virtually located in the interface CLINT can be managed by the controller NFCC.

It will be understood by those skilled in the art that various alternative embodiments of the present invention are possible, both concerning the format of the commands, described here only as an example (particularly the bit "T" can be removed to obtain 124 routing channels instead of 64 while keeping a header field of 8 bits), the format of the routing table and the static or dynamic management, or both at once, of the routing table.

APPENDIX 1

Forming an Integral Part of the Description

A/ Examples of Routing Commands
General Format

|  | Header | | | Parameters |
|---|---|---|---|---|
| Size | 1 bit | 1 bit | 6 bits | 2 or 3 bytes |
| Means or contains | T | L | CCMD | According to the command |
| Value | 1 | 0-1 | 0-31 | |

T = Type;
T = 1 for a command or a response to a command
L = length of the "parameters" field: 2 bytes if L = 0 or 3 bytes if L = 1
CCMD = code of the command or of the message Examples of Commands and Response Messages:

"Creating a Route" Command:

|  | Header | | | Parameters | | | |
|---|---|---|---|---|---|---|---|
| Size | 1 bit | 1 bit | 6 bits | 1 byte | 1 byte | 4 bits | 4 bits |
| Means or contains | T | L | CCMD | IDsp | IDdp | Mi | PTi |
| Value | 1 | 1 | VAL1 | 0-255 | 0-255 | 0-15 | 0-15 |

VAL1 = value of the code of the command
IDsp = Identifier of the source point of the command
IDdp = Identifier of the destination point of the route
Mi = operating mode of the contactless data send/receive interface (M1, M2 or M3)
PTi = contactless communication protocol (PT1, PT2 or PT3)

"Route Creation OK" Message

|  | Header | | | Parameters | | |
|---|---|---|---|---|---|---|
| Size | 1 bit | 1 bit | 6 bits | 1 byte | 6 bits | 2 bits |
| Means or contains | T | L | CCMD | IDsp | CHANi | RFU |
| Value | 1 | 0 | VAL2 | 0-255 | 0-63 | 0-3 |

VAL2 = value of the code of the response
IDsp = Identifier of the source point of the command
CHANi = Number of the route allocated (Channel Number)
RFU = Reserved for future use "Route Creation Error" Message

|  | Header | | | Parameters | |
|---|---|---|---|---|---|
| Size | 1 bit | 1 bit | 6 bits | 1 byte | 1 byte |
| Means or contains | T | L | CCMD | IDsp | IDdp |
| Value | 1 | 0 | VAL3 | 0-255 | 0-255 |

VAL3 = value of the code of the message
IDsp = Identifier of the source point of the command
IDdp = Identifier of the destination point of the route
Mi = Operating mode of the contactless data send/receive interface (M1, M2 or M3)
PTi = contactless communication protocol (PT1, PT2 or PT3)

"Route Modification" or "Route Removal" Command

|  | Header | | | Parameters | | | | |
|---|---|---|---|---|---|---|---|---|
| Size | 1 bit | 1 bit | 6 bits | 1 byte | 6 bits | 2 bits | 4 bits | 4 bits |
| Means or contains | T | L | CCMD | IDsp | CHANi | RFU | Mi | PTi |
| Value | 1 | 1 | VAL4 or VAL5 | 0-255 | 0-63 | 0-3 | 0-15 | 0-15 |

VAL4 or VAL5 = value of the code of each command
IDsp = Identifier of the source point of the command
CHANi = Number of the route to be modified or removed
RFU = Reserved for future use
Mi = operating mode of the contactless data send/receive interface (M1, M2 or M3)
PTi = contactless communication protocol (PT1, PT2 or PT3)

"Route Modification OK" or "Route Removal OK" Messages

| Size | Header | | | Parameters | | |
|---|---|---|---|---|---|---|
| | 1 bit | 1 bit | 6 bits | 1 byte | 6 bits | 2 bits |
| Means or contains | T | L | CCMD | IDsp | CHANi | RFU |
| Value | 1 | 0 | VAL6 or VAL7 | 0-255 | 0-63 | 0-3 |

VAL6 or VAL 7 = value of the code of each message
IDsp = Identifier of the source point of the command
CHANi = Number of the route modified or removed
RFU = Reserved for future use "Route Modification Error" or "Route Removal Error" Messages

| Size | Header | | | Parameters | | |
|---|---|---|---|---|---|---|
| | 1 bit | 1 bit | 6 bits | 1 byte | 6 bits | 2 bits |
| Means or contains | T | L | CCMD | IDsp | CHANi | RFU |
| Value | 1 | 0 | VAL8 or VAL9 | 0-255 | 0-63 | 0-3 |

VAL8 or VAL 9 = value of the code of each message
IDsp = Identifier of the source point of the command
CHANi = Number of the route in question
RFU = Reserved for future use
B/Examples of data frames
T = 0 for a data frame or a response to a data frame
L = 0 if frame of 256 bytes of data
L = 1 if frame of 64K bytes of data
DL = Length of the data in bytes
DATA = Application data
CHANi = routing channel number Frame of 255 Bytes of Data

| Size | Header | | | | |
|---|---|---|---|---|---|
| | 1 bit | 1 bit | 6 bits | 1 byte | 0 to 255 bytes |
| Means or contains | T | L | CHANi | DL | DATA |
| Value | 0 | 0 | 0-63 | 255 | |

Frame of 64 K Bytes of Data

| Size | Header | | | | |
|---|---|---|---|---|---|
| | 1 bit | 1 bit | 6 bits | 2 bytes | 0 to 65535 bytes |
| Means or contains | T | L | CHANi | DL | DATA |
| Value | 0 | 1 | 0-63 | 65535 | |

"Acknowledgement of Receipt without Error" Message

| | Size | | |
|---|---|---|---|
| | 1 bit | 1 bit | 6 bits |
| Means or contains | T | No error | CHANi |
| Value | 0 | 0 | 0-63 |

"Receipt Error" Message

| | Size | | | |
|---|---|---|---|---|
| | 1 bit | 1 bit | 6 bits | 1 byte |
| Means or contains | T | Error | CHANi | Code of the error |
| Value | 0 | 1 | 0-63 | 0-255 |

APPENDIX 2

Forming an Integral Part of the Description—Examples of Routing Tables

TABLE 1

Example of dynamic routing table with source points located in HP1 or HP2

| CHANi | IDsp | PTi | Mi | IDdp Send | Notify | Comments |
|---|---|---|---|---|---|---|
| 1 | ID(P1) | PT1 | M1 | ID(P3) | ID(P2) | Host processor HP1 to interface CLINT in ISOA reader mode |
| 2 | ID(P1) | PT2 | M1 | ID(P3) | — | Host processor HP1 to interface CLINT in ISOB reader mode |
| 3 | ID(P1) | PT3 | M1 | ID(P3) | — | Host processor HP1 to interface CLINT in ISO15 reader mode |
| 4 | ID(P1) | PT1 | M3 | ID(P3) | ID(P2) | Host processor HP1 to interface CLINT in ISOA device mode |
| 5 | ID(P1) | PT2 | M3 | ID(P3) | — | Host processor HP1 to interface CLINT in ISOB device mode |
| 6 | ID(P1) | PT3 | M3 | ID(P3) | — | Host processor HP1 to interface CLINT in ISO15 device mode |
| 7 | ID(P1) | — | — | ID(P2) | | Host processor HP1 to SIM card (HP2) |
| 8 | ID(P2) | — | — | ID(P1) | — | SIM card (HP2) to host processor |
| 9 | ID(P2) | PT1 | M1 | ID(P3) | — | SIM card (HP2) to interface CLINT in ISOA reader mode |
| 10 | ID(P2) | PT2 | M1 | ID(P3) | ID(P2) | SIM card (HP2) to interface CLINT in ISOB reader mode |
| 11 | ID(P2) | PT3 | M1 | ID(P3) | ID(P2) | SIM card (HP2) to interface CLINT in ISO15 reader mode |
| 12 | ID(P2) | PT1 | M3 | ID(P3) | — | SIM card (HP2) to interface CLINT in ISOA device mode |
| 13 | ID(P2) | PT2 | M3 | ID(P3) | ID(P2) | SIM card (HP2) to interface CLINT in ISOB device mode |
| 14 | ID(P2) | PT3 | M3 | ID(P3) | ID(P2) | SIM card (HP2) to interface CLINT in ISO15 device mode |

TABLE 2

Example of pre-saved routing table with source points located in HP1 or HP2

| CHANi | IDsp | PTi | Mi | IDdp Send | Notify | Busy | Comments |
|---|---|---|---|---|---|---|---|
| 1 | ID(P1) | PT1 | M1 | ID(P3) | ID(P2) | 1 | Host processor HP1 to interface CLINT in ISOA reader mode |
| 2 | ID(P1) | PT2 | M1 | ID(P3) | — | 0 | Host processor HP1 to interface CLINT in ISOB reader mode |
| 3 | ID(P1) | PT3 | M1 | ID(P3) | — | 0 | Host processor HP1 to interface CLINT in ISO15 reader mode |
| 4 | ID(P1) | PT1 | M3 | ID(P3) | ID(P2) | 0 | Host processor HP1 to interface CLINT in ISOA device mode |
| 5 | ID(P1) | PT2 | M3 | ID(P3) | — | 0 | Host processor HP1 to interface CLINT in ISOB device mode |
| 6 | ID(P1) | PT3 | M3 | ID(P3) | — | 0 | Host processor HP1 to interface CLINT in ISO15 device mode |
| 7 | ID(P1) | — | — | ID(P2) | | 1 | Host processor HP1 to SIM card (HP2) |
| 8 | ID(P2) | — | — | ID(P1) | — | 0 | SIM card (HP2) to host processor HP1 |
| 9 | ID(P2) | PT1 | M1 | ID(P3) | — | 0 | SIM card (HP2) to interface CLINT in ISOA reader mode |
| 10 | ID(P2) | PT2 | M1 | ID(P3) | ID(P2) | 0 | SIM card (HP2) to interface CLINT in ISOB reader mode |
| 11 | ID(P2) | PT3 | M1 | ID(P3) | ID(P2) | 0 | SIM card (HP2) to interface CLINT in ISO15 reader mode |
| 12 | ID(P2) | PT1 | M3 | ID(P3) | — | 1 | SIM card (HP2) to interface CLINT in ISOA device mode |
| 13 | ID(P2) | PT2 | M3 | ID(P3) | ID(P2) | 0 | SIM card (HP2) to interface CLINT in ISOB device mode |
| 14 | ID(P2) | PT3 | M3 | ID(P3) | ID(P2) | 0 | SIM card (HP2) to interface CLINT in ISO15 device mode |

TABLE 3

Example of dynamic routing table with a source point located in the interface CLINT and wherein all the data are sent to both host processors HP1, HP2

| CHANi | IDsp | PTi | Mi | IDdp | Comments |
|---|---|---|---|---|---|
| 40 | ID(P3) | PT1 | M1 | ID(P1) ID(P2) | Interface CLINT in ISO A reader mode to host processors HP1, HP2 |
| 41 | ID(P3) | PT2 | M1 | ID(P1) ID(P2) | Interface CLINT in ISO B reader mode to host processors HP1, HP2 |
| 42 | ID(P3) | PT3 | M1 | ID(P1) ID(P2) | Interface CLINT in ISO 15693 reader mode to host processors HP1, HP2 |
| 43 | ID(P3) | PT1 | M2 | ID(P2) ID(P2) | Interface CLINT in ISO A emulation mode to host processors HP1, HP2 |
| 44 | ID(P3) | PT2 | M2 | ID(P1) ID(P2) | Interface CLINT in ISO B emulation mode to host processors HP1, HP2 |
| 45 | ID(P3) | PT3 | M2 | ID(P1) ID(P2) | Interface CLINT in ISO 15693 emulation mode to host processors HP1, HP2 |
| 46 | ID(P3) | PT1 | M3 | ID(P1) ID(P2) | Interface CLINT in ISO A device mode to host processors HP1, HP2 |
| 47 | ID(P3) | PT2 | M3 | ID(P1) ID(P2) | Interface CLINT in ISO B device mode to host processors HP1, HP2 |
| 48 | ID(P3) | PT3 | M3 | ID(P1) ID(P2) | Interface CLINT in ISO 15693 device mode to host processors HP1, HP2 |

TABLE 4

Example of pre-saved routing table having a source point located in the interface CLINT

| CHANi | IDsp | PTi | Mi | IDdp Send | Notify | Used | Comments |
|---|---|---|---|---|---|---|---|
| 40 | ID(P3) | PT1 | M1 | ID(P1) | ID(P2) | | Interface CLINT in ISO A reader mode to host processor HP1 |
| 41 | ID(P3) | PT2 | M1 | ID(P1) | ID(P2) | | Interface CLINT in ISO B reader mode to host processor HP1 |
| 42 | ID(P3) | PT3 | M1 | ID(P2) | | | Interface CLINT in ISO 15693 reader mode to SIM card (HP2) |
| 43 | ID(P3) | PT1 | M2 | ID(P2) | | | Interface CLINT in ISO A card emulation mode to SIM card (HP2) |
| 44 | ID(P3) | PT2 | M2 | ID(P1) | — | | Interface CLINT in ISO B card emulation mode to host processor HP1 |
| 45 | ID(P3) | PT3 | M2 | — | ID(P2) | | Interface CLINT in ISO 15693 card emulation mode to SIM card (HP2) (notification only) |
| 46 | ID(P3) | PT1 | M3 | ID(P1) | ID(P2) | | ISO A device mode; matching managed by the host processor |
| 47 | ID(P3) | PT2 | M3 | — | — | | No action (configuration forbidden) |
| 48 | ID(P3) | PT3 | M3 | ID(P1) | ID(P2) | | ISO 15693 device mode; matching managed by the host processor |

It will be appreciated by those skilled in the art that changes could be made to the embodiments described above without departing from the broad inventive concept thereof. It is understood, therefore, that the invention is not limited to the particular embodiments disclosed, but it is intended to cover modifications within the spirit and scope of the present application.

I claim:

1. A method for routing data in a chipset arranged in a portable device, the chipset comprising at least one host processor, a controller, and a Near Field Communication (NFC)-type contactless data send/receive interface, the method comprising:

causing a source point located in the host processor in the portable device to send a command for opening a first data path designating a destination point located in the contactless data send/receive interface in the portable device;

in response to the command for opening the first data path, defining, by the controller in the portable device, the first data path by allocating to the first data path a routing channel number and by saving in a routing table the routing channel number and routing parameters comprising at least one identifier of the source point and one identifier of the destination point;

causing the source point to send to the controller data encapsulated in a frame having a header field comprising the routing channel number; and upon receiving the data encapsulated in the frame having a header field comprising the routing channel number, causing the controller to search for a destination point of the data in the routing table by using the routing channel number as an index to select the destination point to which the controller subsequently sends the data.

2. The method of claim 1, implemented in a chipset, wherein the contactless data send/receive interface is configurable according to several operating modes and according to several contactless communication protocols, the method further comprising:

in response to a command for opening the first data path sent by a source point located in the host processor and designating the destination point located in the contactless data send/receive interface, opening, by the controller, the first data path between the source point and the destination point by allocating to the first data path a routing channel number and by saving in the routing table the routing channel number and routing parameters comprising an operating mode parameter of the contactless data send/receive interface and a contactless communication protocol parameter; and configuring, by the controller, the contactless data send/receive interface to send data in a contactless data transmission channel by using the operating mode and contactless communication protocol parameters contained in the routing table for the first data path through which the data to be sent has been received.

3. The method of claim 1, implemented in a chipset comprising at least two host processors, wherein the controller also uses the routing table to open a second data path between the two host processors.

4. The method of claim 1, wherein the controller uses commands for creating data paths comprising both routing parameters and configuration parameters for configuring the contactless data send/receive interface, and saves the routing parameters and the configuration parameters in the routing table.

5. The method of claim 1, wherein the controller dynamically fills or empties the routing table when data paths having a source point located in a host processor are created or closed.

6. The method of claim 1, wherein the controller further pre-saves, in the routing table, parameters of data paths having a source point located in a host processor.

7. The method of claim 1, implemented in a chipset comprising at least two host processors, and wherein, when data is received by the contactless data send/receive interface via a contactless data transmission channel, the controller identifies at least one recipient host processor of the data using at least as determination criteria the operating mode and the contactless communication protocol used by the contactless data send/receive interface to create the contactless data transmission channel through which the data is received.

8. The method of claim 7, further comprising:

pre-saving, in the routing table by the controller, parameters of second data paths each having a source point located in the contactless data send/receive interface, the parameters of each second data path comprising at least one identifier of a destination point, an operating mode parameter of the contactless data send/receive interface and a contactless communication protocol parameter; and when data is received by the contactless data send/receive interface via a contactless data transmission channel, determining, by the controller, at least one destination point of the data by searching in the routing table for the second data path having an operating mode parameter and a contactless communication protocol parameter corresponding to the operating mode and contactless communication protocol parameters used by the contactless data send/receive interface to create the contactless data transmission channel through which the data is received.

9. The method of claim 1, wherein source points or destination points saved in the routing table are services executed by a host processor.

10. The method of claim 1, wherein the controller stores, in the routing table, routing parameters further comprising an identifier of a point of notification which must receive a copy of the data sent to the destination point.

11. The method of claim 1, implemented in a chipset in which a host processor is a secure circuit.

12. A chipset for sending/receiving data comprising a Near Field Communication (NFC)-type contactless data send/receive interface, a controller, and at least one input/output port to link the contactless data send/receive interface to a host processor, the contactless interface, the controller, and the host processor being arranged in a portable device, the controller being configured to:

in response to a command for opening a first data path sent by a source point located in a host processor and designating a destination point located in the contactless data send/receive interface, open the first data path between the source point and a destination point by allocating to the first data path a routing channel number and by saving in a routing table the routing channel number and routing parameters comprising at least one identifier of the source point and one identifier of the destination point; and upon receiving data from the source point encapsulated in a frame having a header field comprising the routing channel number, search for a destination point of the data in the routing table using the routing channel number as index to select the destination point to which the controller is configured to send the data.

13. The chipset of claim 12, wherein:

the contactless data send/receive interface is configurable according to several operating modes and according to several contactless communication protocols;

the controller configured to, in response to a command for opening the first data path sent by a source point located in the host processor and designating the destination point located in the contactless data send/receive interface, open the first data path between the source point and the destination point by allocating to the first data path a routing channel number and by saving in the routing table the routing channel number and routing parameters comprising an operating mode parameter of the contactless data send/receive interface and a contactless communication protocol parameter; and the contactless data send/receive interface being configured to send data in a contactless data transmission channel by using the operating mode and contactless communication protocol parameters contained in the routing table for the first data path through which the data to be sent have been received.

14. The chipset of claim 12, comprising at least two input/output ports and wherein the controller also uses the routing table to open a second data path between two host processors.

15. The chipset of claim 12, wherein the controller is configured to decode commands for creating data paths comprising routing parameters and configuration parameters for configuring the contactless data send/receive interface, and to save in the routing table the routing and configuration parameters present in the commands.

16. The chipset of claim 12, wherein the controller is configured to dynamically fill or empty the routing table when data paths having a source point located in a host processor are created or closed.

17. The chipset of claim 12, wherein the controller is configured to pre-save, in the routing table, parameters of data paths having a source point located in a host processor.

18. The chipset of claim 12, wherein the controller or the contactless data send/receive interface is configured to, when data are received by the contactless data send/receive interface via a contactless data transmission channel, determine a destination point of the data by using as determination criteria the operating mode and the contactless communication protocol used by the contactless data send/receive interface to create the contactless data transmission channel through which the data are received.

19. The chipset of claim 12, wherein the controller is configured to:
  pre-save, in the routing table, parameters of second data paths each having a source point located in the contactless data send/receive interface, the parameter of each second data path comprising at least one identifier of a destination point, one operating mode parameter of the contactless data send/receive interface and one contactless communication protocol parameter; and
  when data is received by the contactless data send/receive interface via a contactless data transmission channel, determine at least one destination point of the data by searching in the routing table for the second data path having an operating mode parameter and a contactless communication protocol parameter corresponding to the operating mode and contactless communication protocol parameters used by the contactless data send/receive interface to create the contactless data transmission channel through which the data are received.

20. The chipset of claim 12, wherein source points or destination points saved in the routing table are services executed by a host processor.

21. The chipset of claim 12, wherein the routing parameters stored in the routing table further comprise an identifier of a point of notification which must receive a copy of the data sent to the destination point.

22. The chipset of claim 12, linked to a host processor formed by a secure circuit.

\* \* \* \* \*